US011875961B2

(12) United States Patent
Long et al.

(10) Patent No.: US 11,875,961 B2
(45) Date of Patent: Jan. 16, 2024

(54) CIRCUIT BREAKER AND POWER DISTRIBUTION SYSTEM

(71) Applicant: Huawei Digital Power Technologies Co., Ltd., Shenzhen (CN)

(72) Inventors: Haibo Long, Dongguan (CN); Zehua Liang, Dongguan (CN); Yanxing Yang, Dongguan (CN); Wei Guo, Dongguan (CN); Xiaoke Ran, Dongguan (CN); Zezhou Yang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/473,581

(22) Filed: Sep. 13, 2021

(65) Prior Publication Data

US 2021/0407755 A1 Dec. 30, 2021

Related U.S. Application Data

(63) Continuation of application No. PCT/CN2020/139461, filed on Dec. 25, 2020.

(30) Foreign Application Priority Data

Dec. 25, 2019 (CN) ........................ 201911358029.6

(51) Int. Cl.
*H01H 71/04* (2006.01)
*H01H 71/02* (2006.01)
(Continued)

(52) U.S. Cl.
CPC ........ *H01H 71/04* (2013.01); *H01H 71/0264* (2013.01); *H01H 71/08* (2013.01); *H01H 73/14* (2013.01); *H01H 2071/042* (2013.01)

(58) Field of Classification Search
CPC .... H01H 71/04; H01H 71/0264; H01H 71/08; H01H 73/14; H01H 2071/042;
(Continued)

(56) References Cited

U.S. PATENT DOCUMENTS 4,786,295 A * 11/1988 Newman .............. B01D 46/446 55/471
4,907,003 A * 3/1990 Marshall ............ H04B 7/18517 342/362
(Continued)

FOREIGN PATENT DOCUMENTS

CN 2819454 Y 9/2006
CN 201163381 Y 12/2008
(Continued)

*Primary Examiner* — Shawki S Ismail
*Assistant Examiner* — Lisa N Homza
(74) *Attorney, Agent, or Firm* — Leydig, Voit & Mayer, Ltd.

(57) ABSTRACT

A circuit breaker and a power distribution system are provided. The circuit breaker includes a housing and an internal element disposed inside the housing. The housing includes a front panel and a rear panel that are disposed opposite to each other, the front panel is disposed with a button, a status display unit, and a power wiring port, and the rear panel is disposed with a power interface and a signal interface. The power wiring port and the power interface are connected to a circuit of a power distribution system. The signal interface is internally and electrically connected to the button, the status display unit, and the internal element, and the signal interface is externally configured to be electrically connected to a control unit disposed outside the housing. A control signal of the control unit implements working of the button, the status display unit, and the internal element.

20 Claims, 12 Drawing Sheets

(51) Int. Cl.
*H01H 71/08* (2006.01)
*H01H 73/14* (2006.01)

(58) Field of Classification Search
CPC .... H01H 71/0271; H01H 73/08; H01H 73/12; H01H 71/00; H01H 71/02; H02J 3/00
USPC .......................................................... 335/17
See application file for complete search history.

(56) References Cited

U.S. PATENT DOCUMENTS

| | | | | |
|---|---|---|---|---|
| 5,034,731 | A | 7/1991 | Rundsztuk et al. | |
| 5,537,026 | A * | 7/1996 | Estes | H02M 5/2573 361/57 |
| 5,670,936 | A * | 9/1997 | Estes | H02M 5/00 323/239 |
| D695,229 | S * | 12/2013 | Ran | D13/158 |
| 2001/0005019 | A1* | 6/2001 | Ishikawa | G02F 1/136213 257/E27.111 |
| 2002/0004915 | A1* | 1/2002 | Fung | G06F 1/3221 713/320 |
| 2002/0062454 | A1* | 5/2002 | Fung | G06F 3/0689 713/300 |
| 2003/0196126 | A1* | 10/2003 | Fung | G06F 1/3203 713/300 |
| 2005/0046525 | A1 | 3/2005 | Tongo et al. | |
| 2005/0108582 | A1* | 5/2005 | Fung | G06F 1/3209 713/300 |
| 2006/0248360 | A1* | 11/2006 | Fung | G06F 1/3296 713/300 |
| 2007/0019453 | A1* | 1/2007 | Pierce | H01M 50/296 363/107 |
| 2007/0101173 | A1* | 5/2007 | Fung | G06F 1/3209 713/300 |
| 2007/0240006 | A1* | 10/2007 | Fung | G06F 1/32 713/323 |
| 2008/0258667 | A1* | 10/2008 | Morris | G01R 1/04 318/490 |
| 2009/0144568 | A1* | 6/2009 | Fung | G06F 1/324 713/300 |
| 2009/0301851 | A1* | 12/2009 | Morris | H01H 3/58 200/331 |
| 2016/0111878 | A1* | 4/2016 | Qureshi | H01R 24/30 29/622 |
| 2018/0076663 | A1* | 3/2018 | Gudgel | H02J 7/35 |
| 2019/0295797 | A1* | 9/2019 | Ran | H01H 71/125 |
| 2019/0308741 | A1* | 10/2019 | Dittmar | F02D 29/06 |

FOREIGN PATENT DOCUMENTS

| | | | |
|---|---|---|---|
| CN | 103441014 | A | 12/2013 |
| CN | 205016477 | U | 2/2016 |
| CN | 106298382 | A | 1/2017 |
| CN | 205943973 | U | 2/2017 |
| CN | 206774470 | U | 12/2017 |
| CN | 108321047 | A | 7/2018 |
| CN | 208111370 | U | 11/2018 |
| CN | 109031546 | A | 12/2018 |
| CN | 208256597 | U | 12/2018 |
| CN | 109119978 | A | 1/2019 |
| CN | 111029223 | A | 4/2020 |
| EP | 3444834 | A1 | 2/2019 |
| JP | 2006092979 | A | 4/2006 |
| WO | 2016156131 | A2 | 10/2016 |

* cited by examiner

CIRCUIT BREAKER AND POWER DISTRIBUTION SYSTEM

CROSS-REFERENCE TO RELATED APPLICATIONS

This application is a continuation of International Application No. PCT/CN2020/139461, filed on Dec. 25, 2020, which claims priority to Chinese Patent Application No. 201911358029.6, filed on Dec. 25, 2019. The disclosures of the aforementioned applications are hereby incorporated by reference in their entireties.

TECHNICAL FIELD

Embodiments of this application relate to the field of communication power supply technologies, and in particular, to a circuit breaker and a power distribution system.

BACKGROUND

A communication power supply is an important component of a whole communications system, just like the heart of a human body. Power supply quality and power supply reliability of a power supply device directly affect the whole communications system and quality of the whole communications system. The communication power supply includes a power distribution system, and the power distribution system can perform operations such as a connection, breaking, protection, transferring, and measurement on an alternating current or a direct current. A circuit breaker is an important component of the power distribution system. The circuit breaker is a switch with a fault current breaking capacity. A breaking action may be triggered when a current exceeds a preset limit value, or may be triggered according to a breaking instruction.

Usually, the power distribution system is integrated into a power shelf. To be specific, components with functions such as power distribution, power conversion, protection, and monitoring are integrated inside the shelf as a pluggable module. With development of an intelligent communications system, there are more power distribution requirements. The circuit breaker is an important component of the power distribution system, and usage of the circuit breaker is increasingly higher. Increasingly more circuit breakers need to be configured in the power shelf. Therefore, how to achieve a circuit breaker that has a small size and low costs and that is easily integrated is a development trend in the industry.

SUMMARY

This application provides a circuit breaker and a power distribution system that have advantages of a small size, low costs, and easy integration.

According to a first aspect, this application relates to a circuit breaker, including a housing and an internal element disposed inside the housing. The internal element includes a mechanical device and an electronic device, for example, a main contact, an actuating mechanism, an electromagnetic tripping device, or a sensor. The housing includes a front panel and a rear panel that are disposed opposite to each other, and the front panel is disposed with a button, a status display unit, and a power wiring port. Specifically, the front panel may alternatively not be disposed with the button and the status display unit, to simplify a configuration of the front panel. The internal element in the circuit breaker works under control through remote control and wireless transmission. For example, the circuit breaker has a Wi-Fi module, the circuit breaker may be connected to a mobile terminal (a mobile phone), and the circuit breaker is controlled by using the mobile phone through Wi-Fi. Alternatively, a remote computer may be used to operate the circuit breaker. The rear panel is disposed with a power interface and a signal interface, the power wiring port and the power interface are configured to be connected to a cable or a busbar of a power distribution system, and a main power circuit is provided. The signal interface is internally and electrically connected to the button, the status display unit, and the internal element, and the signal interface is externally configured to be electrically connected to a control unit disposed outside the housing. A control signal of the control unit that is transmitted through the signal interface is used to implement working of the button, the status display unit, and the internal element.

In this application, the rear panel is disposed with the signal interface, and is electrically connected to the external control unit through the signal interface. The control unit outside the circuit breaker is used to control a working status of the circuit breaker, and control the button, the status display unit, and an internal component. In this case, no controller needs to be disposed inside the circuit breaker, to save internal space of the circuit breaker, and facilitate a requirement for a small size design of the circuit breaker. In addition, costs of the circuit breaker are reduced. In this application, a central controller and a communications unit are disposed on a signal backplane of the power distribution system, and the central controller includes a control unit that matches the circuit breaker. A plurality of control units for controlling different circuit breakers may be integrated into one or more chips. For the power distribution system, the control units for controlling the circuit breakers are integrated on the signal backplane. In comparison with a case in which a controller is disposed in each circuit breaker, costs are reduced to a considerable extent, and an integration level of the power distribution system is higher.

In a possible implementation, the status display unit includes a bicolor indicator. When the circuit breaker is controlled to be powered off, the indicator is off. To be specific, the control unit sends a signal indicating that the indicator is off to the signal interface, so that the status display unit receives the signal, and the bicolor indicator enters an off state under control of the control unit. When the circuit breaker is faulty, the control signal received by the signal interface is a signal indicating that the indicator alternately flashes two colors. For example, the bicolor indicator is a red/green bicolor indicator. When the circuit breaker is faulty, a signal received from the external control unit is controlling the bicolor indicator to flash red, green, red, green, . . . , so that the red/green indicator flashes alternately at such a regular. When the circuit breaker is in an opened state, the control signal received by the signal interface indicates that the indicator flashes a first color. When the circuit breaker is in a closed state, the control signal received by the signal interface indicates that the indicator flashes a second color. For example, the first color is red, and the second color is green. When the circuit breaker is in a state of being configured, the control signal received by the signal interface indicates that the indicator is in a first color flashing state or a second color flashing state, for example, a red light flashing state or a green light flashing state. This implementation provides a new circuit breaker status display solution. The bicolor indicator is used to indicate the working status of the circuit breaker, so that not only space on the front panel is saved, but also the working state is intuitive and is easily determined.

In a possible implementation, the button includes a housing in a partially transparent state or in a transparent state, and the bicolor indicator is located inside the housing. In this implementation, the bicolor indicator is integrated inside the button, and the housing is in the partially transparent state or in the transparent state, so that a status of the bicolor indicator can be displayed to a user through the housing of the button. This facilitates improvement of the integration level, and saves space on the front panel.

In a possible implementation, the status display unit includes a first indicator and a second indicator. The first indicator is a bicolor indicator. When the circuit breaker is in an opened state, the control signal received by the signal interface indicates that the first indicator flashes a first color. When the circuit breaker is in a closed state, the control signal received by the signal interface indicates that the first indicator flashes a second color. When the circuit breaker is in a state of being configured, the control signal received by the signal interface indicates that the first indicator is in a first color flashing state or a second color flashing state. The second indicator is a single-color indicator, and is configured to indicate whether the circuit breaker is powered off or faulty. When the control unit controls, through the signal interface, the circuit breaker to be powered off, the second indicator is off; when the control unit controls, through the signal interface, the circuit breaker to be powered on, the second indicator is on; or when the circuit breaker is faulty, the second indicator is in a flashing state. In this implementation, two indicators are used to display a status of the circuit breaker. One indicator is used to indicate whether the circuit breaker is powered on or faulty, and the other indicator is used to indicate whether the circuit breaker is open, closed, or being configured, to perform classified display, and provide the user with good experience.

In a possible implementation, the button includes a housing in a partially transparent state or in a transparent state, and the first indicator is located inside the housing. In this implementation, the bicolor indicator is integrated inside of the housing of the button, and the second indicator (the single-color indicator) is disposed outside the button, and is disposed in parallel with the button, to provide the user with good experience.

In a possible implementation, the status display unit includes a first indicator, a second indicator, and a third indicator. When the circuit breaker is in an opened state, the control signal received by the signal interface indicates that the first indicator is on and the second indicator is off; when the circuit breaker is in a closed state, the control signal received by the signal interface indicates that the first indicator is off and the second indicator is on; or when the circuit breaker is in a state of being configured, the control signal received by the signal interface indicates that the first indicator flashes and/or the second indicator flashes. The third indicator is a single-color indicator, and is configured to indicate whether the circuit breaker is powered off or faulty. When the control unit controls, through the signal interface, the circuit breaker to be powered off, the third indicator is off; when the control unit controls, through the signal interface, the circuit breaker to be powered on, the third indicator is on; or when the circuit breaker is faulty, the third indicator is in a flashing state.

Specifically, three single-color indicators are disposed in parallel at a corner position on the front panel, and colors of the three indicators may be the same or different. When the colors are the same, different marks are used to display functions performed by the indicators. For example, a different pattern or character is configured for each indicator on the front panel. When the colors are different, different colors may be used to distinguish between the functions performed by the indicators, or different patterns or characters may be further marked on the front panel.

In another implementation, the status display unit may alternatively be a liquid crystal display or another display window.

The indicator may be an LED indicator.

The button on the front panel may be a mechanical button, an electronic button, or a touch button. When the button is a mechanical button, the button may be a self-locking button capable of maintaining two states of a popping-up state and a pressing-down state, and whether the circuit breaker is on or off may be determined based on the popping-up state and the pressing-down state. The button may alternatively have no self-locking capability. The status of the circuit breaker is switched by pressing the button once, and the status is indicated in cooperation with the status display unit, for example, the LED indicator. The button may be disposed with a housing of a material in the transparent or partially transparent (the partially transparent state includes a translucent state) state, and the status display unit is integrated inside the housing. The button may be a shape such as a circle, a square, or a rounded rectangle. There may be one or two buttons. When there are two buttons, one button is responsible for an opening operation of the circuit breaker, and the other button is responsible for a closing operation of the circuit breaker. Colors of the two buttons may be designed to be different, or shapes of the two buttons may be designed to be different, so that the user distinguishes between the two buttons.

In a possible implementation, the circuit breaker further includes a pull ring and a lock, the front panel and the rear panel are connected by using a side panel, the pull ring is located on a periphery of the front panel, the pull ring is rotatably connected to the side panel, so that the pull ring can be folded or opened relative to the front panel, the lock is movably connected to the housing, the lock fits the pull ring, and the pull ring rotates to drive the lock to move, so that the lock extends or retracts. In this implementation, the circuit breaker is installed in a subrack of the power distribution system, and may be inserted into the subrack and connected to a connector on the signal backplane in the power distribution system through insertion, to implement an electrical connection between the circuit breaker and the control unit in the central controller on the signal backplane, and implement an electrical connection between the circuit breaker and another circuit module on the signal backplane. The circuit breaker may also be pulled out of the subrack for maintenance or replacement. The circuit breaker is inserted into and pulled out of the subrack by using the pull ring. When the circuit breaker is inserted into the subrack, the circuit breaker can be locked into the subrack by using the lock, to prevent the circuit breaker from being accidentally separated from the subrack.

In a possible implementation, a pull ring mounting area is disposed at an edge of the front panel, the pull ring is mounted inside the housing and is located in the pull ring mounting area, and when the pull ring is in a folded state relative to the front panel, a front end face of the pull ring is coplanar with the front panel, and an outer boundary of the pull ring and an outer boundary of the front panel jointly form a square. In this implementation, the pull ring is mounted on an inner side of the housing, and the pull ring mounting area is reserved at the edge of the front panel, to facilitate a design of miniaturization of the circuit breaker. The pull ring occupies space at the edge of the front panel, so that the front panel has a more powerful function, and a small area of the front panel can still be ensured.

Specifically, the pull ring includes a pair of connecting rods disposed opposite to each other and a pull rod connected between the pair of connecting rods, the pull rod is located at one end of the pair of connecting rods, and the other end of the pair of connecting rods is rotatably connected to the side panel of the circuit breaker by using a rotating shaft. When the pull ring is in the folded state relative to the front panel, the pair of connecting rods and the pull rod each are located on one side of the side panel. For example, the pair of connecting rods are respectively located on an external side of a left side panel and an external side of a right side panel of the circuit breaker, and the pull rod is located on an external side of a top side panel or an external side of a bottom side panel of the circuit breaker. When the pull ring is in the folded state, the lock extends out of the side panel of the circuit breaker and the circuit breaker is attached to the subrack through locking. When the pull ring is in an opened state relative to the front panel, the lock retracts to release a locking relationship between the circuit breaker and the subrack. The pull rod rotates to the front of the front panel, so that the user manually pulls the circuit breaker out of the subrack.

In a possible implementation, the end that is of the connecting rod and that is rotatably connected to the side panel is centered at the rotating shaft, and the end of the connecting rod is cam-shaped. Specifically, the end that is of the connecting rod and that is near the rotating shaft is a top abutting end, to abut against the lock. An outer edge of the top abutting end includes a first position and a second position. A distance between the first position and the rotating shaft is greater than a distance between the second position and the rotating shaft. When the pull ring is in the folded state relative to the front panel, the first position abuts against the lock, the lock is in an extended state and fits the subrack to implement locking. When the pull ring is in the opened state relative to the front panel, the second position abuts against the lock, so that the lock is in a retracted state, to release locking between the lock and the subrack.

The lock is slidably connected to the side panel, so that the lock can slide in a direction relative to the side panel. For example, the lock slides in a first direction relative to the side panel, the first direction is consistent with an extension direction of an edge of the front panel, and when the pull ring is in the folded state relative to the front panel, an extension direction of the connecting rod of the pull ring is also the first direction. Specifically, a slide rail may be disposed on the side panel, and the lock is disposed with a slide block or a slide groove that fits the slide rail. The lock is elastically connected to the side panel by using an elastic part, and the elastic part may be a spring. When the pull ring is in the folded state relative to the front panel, the lock is in the extended state, and the elastic part is elastically stretched and has elastic potential energy. When the pull ring is in the opened state relative to the front panel, the elastic potential energy of the elastic part drives the lock to retract automatically.

In a possible implementation, the pull ring includes a first surface and a second surface that are disposed adjacently. When the pull ring is in the folded state relative to the front panel, the first surface faces the side panel, and the second surface faces a direction the same as the front panel. When the pull ring is in the opened state relative to the front panel, the first surface faces the front panel, and an area of the first surface is greater than an area of the second surface. The first surface is configured to contact a finger of the user. The first surface has a large area, to provide better experience. In a process in which the user pulls the pull ring, a hand feeling is better. The second surface is designed to have a small area, so that the pull ring occupies a relatively small area on the periphery of the front panel, to facilitate the small size design of the circuit breaker.

In a possible implementation, the first surface is arc-shaped, and may be a convex arc or a concave arc. An arc-shaped design helps the first surface fit the finger, to facilitate an operation.

In a possible implementation, the first surface is disposed with a rough structure, to increase friction. Specifically, the rough structure may be a bump, a dimple, a texture, or a combination thereof.

In a possible implementation, the signal interface includes a plurality of pins, the plurality of pins include a button signal pin and a status display unit control signal pin, the button signal pin is electrically connected to the button, and the status display unit control signal pin is electrically connected to the status display unit. The plurality of pins further include a power supply pin, an electrical control signal pin, a current sensor pin, and a switch state feedback signal pin. The power supply pin includes two pins. One pin is a power supply positive pin, and the other pin is a power supply negative pin. The current sensor pin also includes two pins: a positive pin and a negative pin. A form of the signal interface provided in this implementation of this application is not limited to fast insertion, a golden finger, pin insertion, aerial insertion, and the like. In a specific implementation, the signal interface is designed as a female connector in the form of fast insertion, and a connector that matches the signal interface is a male connector in a form of a golden finger disposed on the signal backplane. This matching insertion manner facilitates a design, production, and assembly of the signal backplane.

In a possible implementation, the internal element includes a main contact and an auxiliary contact, the main contact is configured to implement the opened state and the closed state of the circuit breaker, the auxiliary contact is electrically connected between the signal interface and the main contact, and the auxiliary contact is configured to transmit an opening/closing signal of the main contact to the control unit through the signal interface, so that the control unit transmits the opening/closing signal of the main contact to the status display unit through the signal interface.

According to a second aspect, this application provides a power distribution system, including a monitoring machine, a signal backplane, and at least two circuit breakers. A central controller and a communications module are disposed on the signal backplane, the central controller includes at least two control units, the signal interfaces of the at least two circuit breakers are electrically connected to the at least two control units in a one-to-one correspondence manner, and the communications module is electrically connected between the monitoring machine and the central controller. The at least two control units may be implemented by using one or more control chips.

DESCRIPTION OF EMBODIMENTS

The following describes the embodiments of this application with reference to accompanying drawings.

Figure 1:
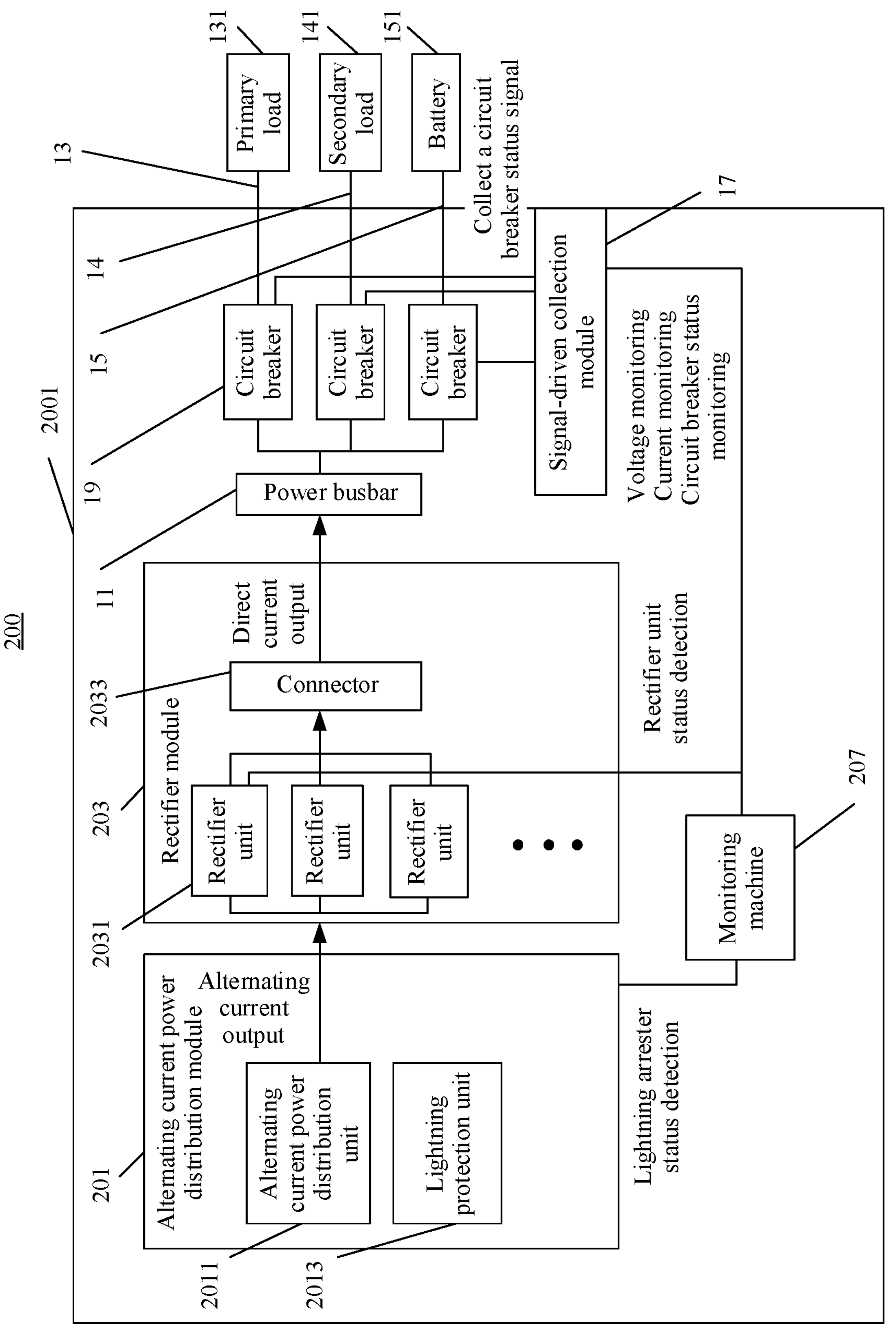
FIG. 1 is a structural block diagram of a power distribution system of a communication power supply according to an implementation of this application.

FIG. 1 is a structural block diagram of a power distribution system of a communication power supply. A power distribution system 200 includes an alternating current power distribution module 201, a rectifier module 203, and a monitoring machine 207.

The alternating current power distribution module 201 is configured to provide alternating current mains. The alternating current power distribution module 201 includes an alternating current power distribution unit 2011 and a lightning protection unit 2013. The lightning protection unit 2011 is configured to: perform lightning protection detection on the alternating current power distribution unit 2011, and provide a detection result for the monitoring machine 207.

The rectifier module 203 is connected to the alternating current power distribution unit 2011 of the alternating current power distribution module 201, and is configured to: convert the alternating current mains into a direct current, and provide the direct current for the direct current power distribution module 205. The rectifier module 203 includes a plurality of rectifier units 2031 and a connector 2033 connected to the plurality of rectifier units 2031.

The power distribution system 200 further includes a power busbar 11, a primary load branch 13, a secondary load branch 14, a battery branch 15, and a signal-driven collection module 17. The power busbar 11 is connected to the connector 2033 of the rectifier module 203. The primary load branch 13, the secondary load branch 14, and the battery branch 15 each include a circuit breaker 19.

The primary load branch 13 further includes a primary load 131 connected to the circuit breaker 19 of the primary load branch 13. The secondary load branch 14 further includes a secondary load 141 connected to the circuit breaker 19 of the secondary load branch 14. The battery branch 15 further includes a battery 151 connected to the circuit breaker 19 of the battery branch 15. The circuit breaker 19 of the primary load branch 13, the circuit breaker 19 of the secondary load branch 14, and the circuit breaker 19 of the battery branch 15 are all connected to the power busbar 11. The circuit breakers 19 of all function areas (accessed by the primary load 131, the secondary load 141, the battery 151) share one power busbar 11, to simplify a structure of the direct current power distribution module 10. The rectifier module 203 is configured to supply power to the primary load 131, the secondary load 141, and the battery 151. The battery 151 is configured to supply power to the primary load 131 and the secondary load 141 when the rectifier module 203 cannot supply power.

The signal-driven collection module 17 is connected to the circuit breaker 19 of the primary load branch 13, the circuit breaker 19 of the secondary load branch 14, and the circuit breaker 19 of the battery branch 15, and is configured to collect a status signal of the circuit breakers 19. The status signal includes a closed state signal, an opened state signal, and a fault tripping state.

The monitoring machine 207 is configured to monitor a status of the circuit breakers 19 based on the status signal collected by the signal-driven collection module 17, to determine whether each circuit breaker 19 can effectively perform circuit conduction and a circuit cutoff, thereby improving power supply safety and reliability of the communication power supply system 200.

In FIG. 1, the alternating current power distribution module 201, the rectifier module 203, the monitoring machine 207, the signal-driven collection module 17, the power busbar 11, and the circuit breaker 19 are integrated into one subrack 2001.

Figure 2:
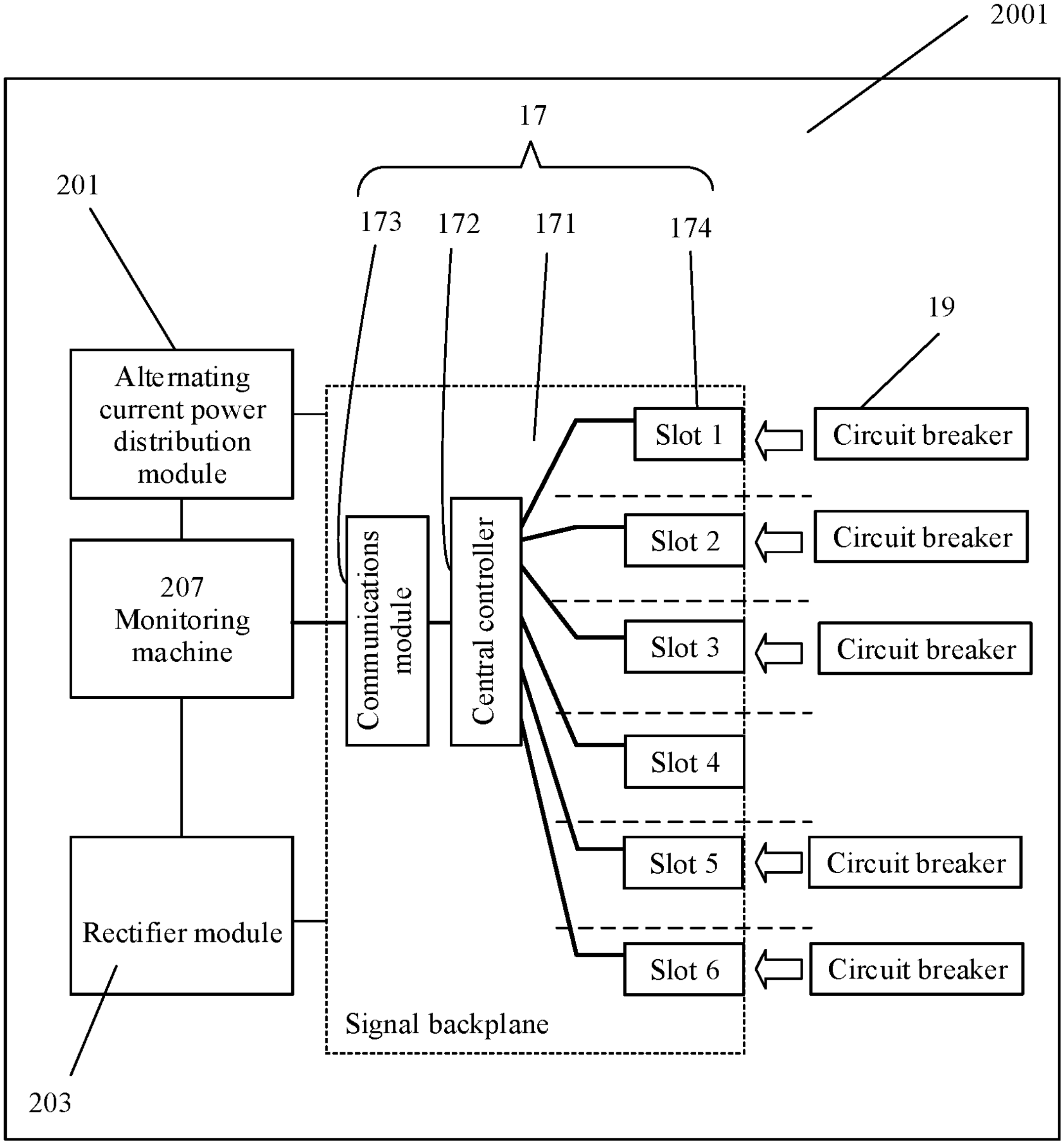
FIG. 2 is a schematic diagram of a connection relationship between a circuit breaker and a central controller on a signal backplane according to an implementation of this application.

A signal backplane is disposed in the subrack. A plurality of circuit breakers may be mounted in the subrack in a pluggable manner, and is connected to a connector on the signal backplane through insertion. Referring to FIG. 2, a specific architecture of the signal-driven collection module 17 is as follows: The signal-driven collection module 17 includes a signal backplane 171, a central controller 172, and a communications module 173. The signal backplane 171 is disposed in the subrack 2001. The central controller 172 and the communications module 173 are disposed on the signal backplane 171. The central controller 172 includes at least two control units, a quantity of control units may be in a one-to-one correspondence with a quantity of circuit breakers 19, and each control unit is configured to control a different circuit breaker 19. The at least two control units may be disposed in one or more control chips. To be specific, one control chip may be disposed on the signal backplane 171, a plurality of control units are integrated into the control chip, and each circuit breaker 19 is electrically connected to a different pin of the control chip, to correspondingly establish an electrical connection relationship with each control unit. Each control unit may also be an independent control chip, so that a faulty control unit can be easily detected and repaired or replaced without affecting normal working of another control unit. The communications module 173 is electrically connected between the monitoring machine 207 and the central controller 172. Specifically, the control unit is disposed in a middle area of the signal backplane 171, and a plurality of connectors 174 are disposed at an edge position of the signal backplane 171 (to be specific, a slot 1, a slot 2, a slot 3, a slot 4, a slot 5, and a slot 6 shown in FIG. 2). After the circuit breaker 19 is mounted in the subrack 2001 in the pluggable manner, signal interfaces of the circuit breaker 19 are respectively connected to the connectors 174 at the edge of the signal backplane 171 through insertion, and the connectors are electrically connected to the control unit (namely, the central controller 172) through internal wiring of the signal backplane. The circuit breaker 19 may be an input circuit breaker or an output circuit breaker, and the connectors 174 (the slots 1 to 6) may be divided into an input circuit breaker slot or an output circuit breaker slot.

A working principle of the foregoing power distribution system is as follows: In a normal case, the rectifier module 203 supplies power to the primary load 131, the secondary load 141, and the battery 151. When the rectifier module 203 cannot supply power, the battery 151 supplies power to the primary load 131 and the secondary load 141. When a voltage of the battery 151 is greater than or equal to a preset maximum threshold voltage and is greater than or equal to a preset minimum threshold voltage, the voltage of the battery 151 may be used by the primary load 131 and the secondary load 141 to simultaneously work. When the voltage of the battery 151 is less than the preset maximum threshold voltage and greater than or equal to the preset minimum threshold voltage, the voltage of the battery 151 is not sufficient for the primary load 131 and the secondary load 141 to simultaneously working, but is sufficient for the primary load 131 to work. Therefore, the monitoring machine 207 controls to open the circuit breaker 19 on the secondary load branch 14 to power off the secondary load branch 14, to ensure that the primary load 131 works normally. The circuit breaker 19 may accept and execute an external instruction. The instruction may be an opening operation instruction or a closing operation instruction, or may be an instruction for configuring a parameter in the control unit (namely, the central controller 172) of the circuit breaker 19. The monitoring machine 207 is connected to the central controller 172 that matches the circuit breaker 19 through a communications bus on the signal backplane 171, and is configured to: monitor a working status of each circuit breaker 19, and control a running parameter of each circuit breaker 19.

Figure 3:
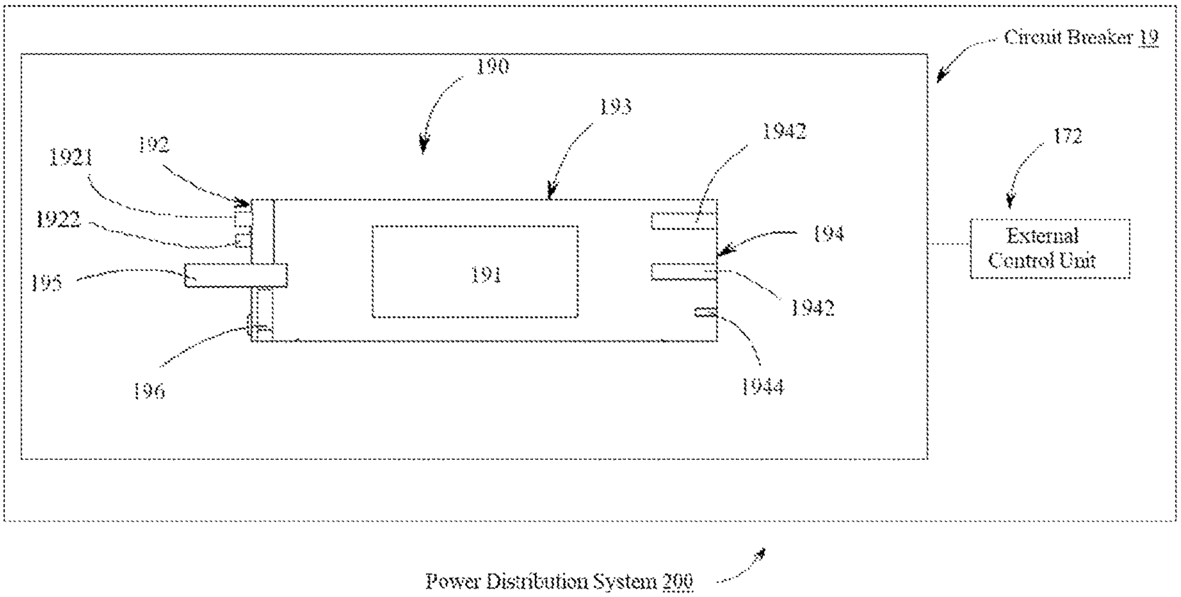
FIG. 3 is a side view of a circuit breaker according to an implementation of this application.
Figure 4:
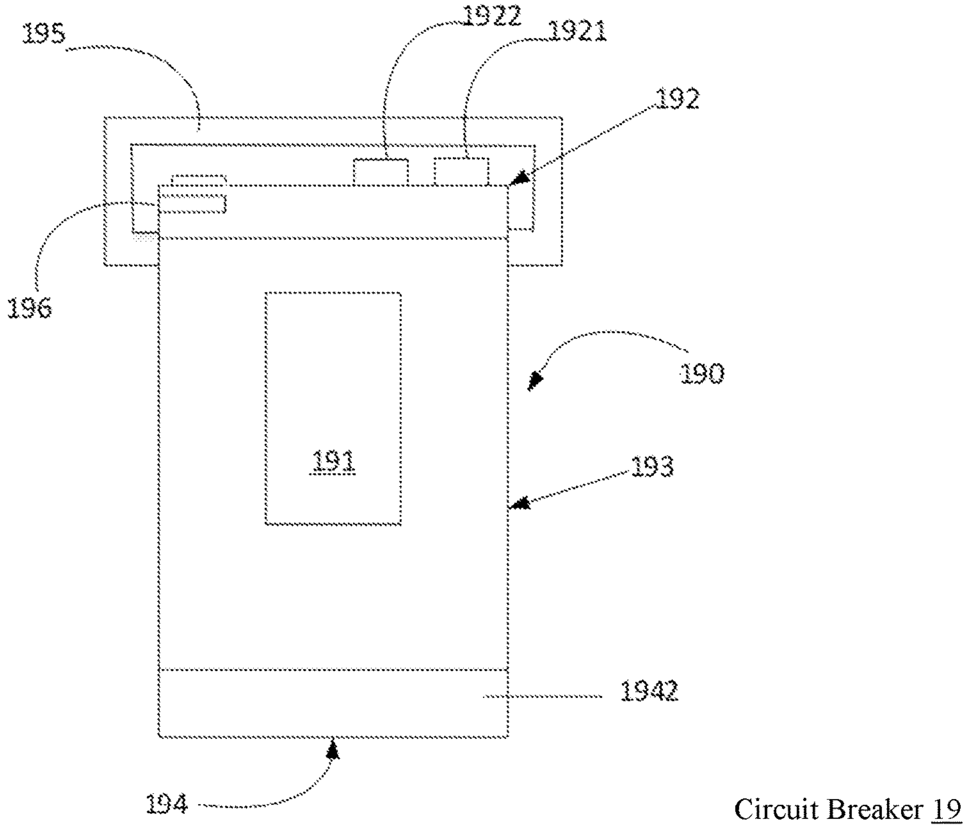
FIG. 4 is a schematic diagram of a front panel of a circuit breaker according to an implementation of this application.
Figure 5:
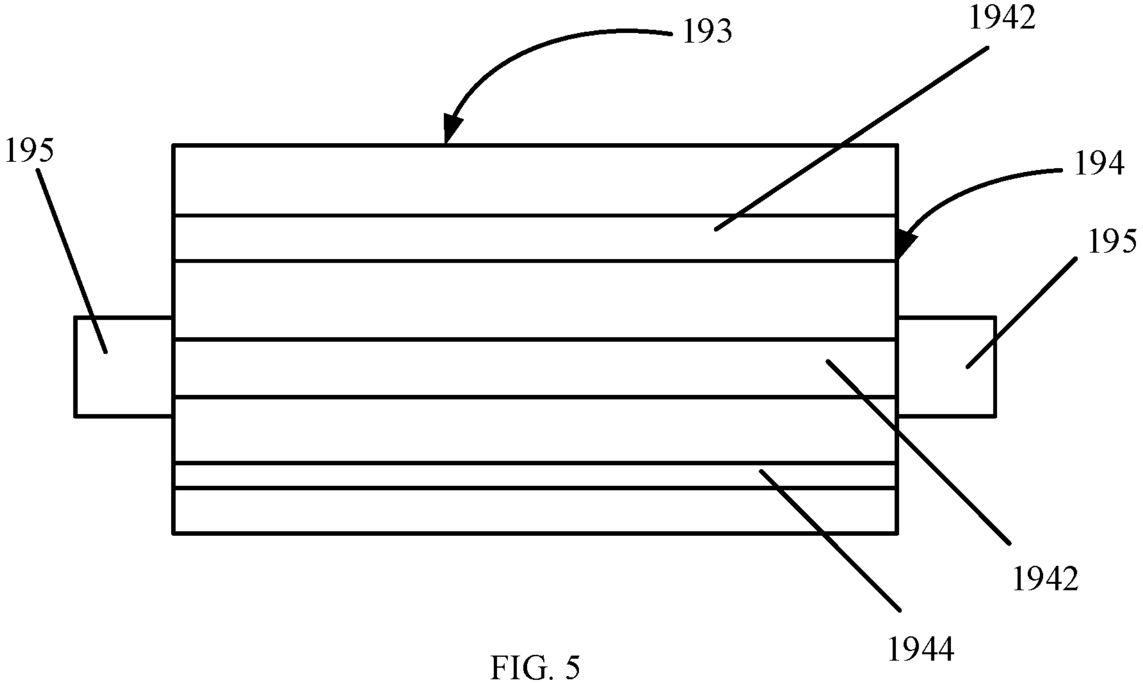
FIG. 5 is a schematic diagram of a rear panel of a circuit breaker according to an implementation of this application.

FIG. 3, FIG. 4, and FIG. 5 are respectively a side view of a circuit breaker 19, a schematic diagram of a front panel, and a schematic diagram of a rear panel. As shown in FIG. 3, the circuit breaker 19 involved in a specific implementation of this application includes a housing 190 and an internal element 191 disposed inside the housing 190. The internal element 191 includes a mechanical device and an electronic device, for example, a main contact, an actuating mechanism, an electromagnetic tripping device, or a sensor. The housing 190 includes a front panel 192 and a rear panel 194 that are disposed opposite to each other, and a side panel 193 connected between the front panel 192 and the rear panel 194. The front panel 192 is disposed with a button 1921 and a status display unit 1922. Specifically, the housing 190 is cuboid, and the front panel 192 and the rear panel 194 are two end faces in a length direction of the housing 190. A part that is of the side panel 193 and that extends between the front panel 192 and the rear panel 194 has a relatively large size, so that the circuit breaker 19 in this application is flattened, depth space of the subrack of the power distribution system can be fully used, and an area that is of a panel of the subrack and that is occupied by the circuit breaker 19 is reduced. In an implementation, the front panel 192 and the rear panel 194 are rectangular or square, and the side panel 193 includes a left side panel, a right side panel, a top side panel, and a bottom side panel that are all planar. In another implementation, the front panel 192 and the rear panel 193 may alternatively be another shape such as a circle and a semicircle, and the side panel 193 may be cylindrical or formed by combining a curved surface and a planar surface.

As shown in FIG. 4, the front panel 192 is further disposed with a power wiring port 1923. In an implementation, a power wiring terminal of the circuit breaker 19 is located inside the housing 190 of the circuit breaker 19, and is close to the front panel 192. The power wiring port 1923 may be a wiring terminal auxiliary hole. A screw may be tightened to drive the wire to be arranged, to fix the wire and the power wiring terminal, or a clip is used to fix the wire. For example, the power wiring terminal automatically locks the wire by using the clip. A screwdriver is inserted into the power wiring port 1923, to release the clip, and separate the wire and power wiring terminal.

The button 1921 and the status display unit 1922 are configured to control and display a working status of the internal element of the circuit breaker 19. Specifically, the front panel 192 may alternatively not be disposed with the button and the status display unit, to simplify a configuration of the front panel 192. The internal element of the circuit breaker may work under control through remote control and wireless transmission. For example, the circuit breaker 19 has a Wi-Fi module, the circuit breaker may be connected to a mobile terminal (a mobile phone), and the circuit breaker is controlled by using the mobile phone through Wi-Fi. Alternatively, a remote computer may be used to operate the circuit breaker.

As shown in FIG. 5, the rear panel is disposed with a power interface 1942 and a signal interface 1944. The power wiring port 1923 and the power interface 1944 are configured to be connected to a cable or a busbar of the power distribution system, and a main power circuit is provided. The signal interface 1944 is internally and electrically connected to the button 1921, the status display unit 1922, and the internal element 191, and the signal interface 1944 is externally configured to be electrically connected to a control unit disposed outside the housing. A control signal of the control unit that is transmitted through the signal interface 1944 is used to implement working of the button 1921, the status display unit 1922, and the internal element 191.

In this application, the signal interface 1944 is disposed on the rear panel 194, and the signal interface 1944 is electrically connected to the external control unit (specifically, the control unit may be a central controller 172 on the signal backplane 171 shown in FIG. 2). In this application, the control unit outside the circuit breaker 19 is used to control a working status of the circuit breaker 19, and provides the control signal for the button 1921, the status display unit 1922, and an internal component 191. In this case, no controller needs to be disposed inside the housing 190 of the circuit breaker 19, to save internal space of the circuit breaker 19, and facilitate a requirement for a small size design of the circuit breaker 19. In addition, costs of the circuit breaker 19 are reduced. In this application, the central controller and a communications unit are disposed on the signal backplane of the power distribution system, and the central controller 172 includes a control unit that matches the circuit breaker. A plurality of control units for controlling different circuit breakers 19 may be integrated into one or more chips. For the power distribution system, the control units for controlling the circuit breakers 19 are integrated on the signal backplane 171. In comparison with a case in which a controller is disposed in each circuit breaker 19, costs are reduced to a considerable extent, and an integration level of the power distribution system is higher.

The signal interface 1944 disposed on the rear panel 194 in this application includes a plurality of pins. For example, the pins may include a button signal pin, a status display unit control signal pin, a power supply pin, an electrical control signal pin, a current sensor pin, and a switch status feedback signal pin. The power supply pin includes two pins. One pin is a power supply positive pin, and the other pin is a power supply negative pin. The current sensor pin also includes two pins: a positive pin and a negative pin. The button signal pin is electrically connected to the button, and the status display unit control signal pin is electrically connected to the status display unit.

In a specific implementation, the signal interface 194 has eight pins, and a specific configuration is as follows:

| Sequence numbers of pins | Functions of pins |
|---|---|
| 1 | Power supply + |
| 2 | Power supply − |
| 3 | Electrical control signal |
| 4 | Current sensor + |
| 5 | Current sensor − |
| 6 | Button signal |
| 7 | Switch status feedback signal |
| 8 | Status display unit control signal |

A form of the signal interface 1944 provided in this implementation of this application is not limited to fast insertion, a golden finger, pin insertion, aerial insertion, and the like. In a specific implementation, the signal interface 1944 is designed as a female connector in a form of fast insertion, and a connector that matches the signal interface is a male connector in a form of a golden finger disposed on the signal backplane. This matching insertion manner facilitates a design, production, and assembly of the signal backplane.

Figure 6:
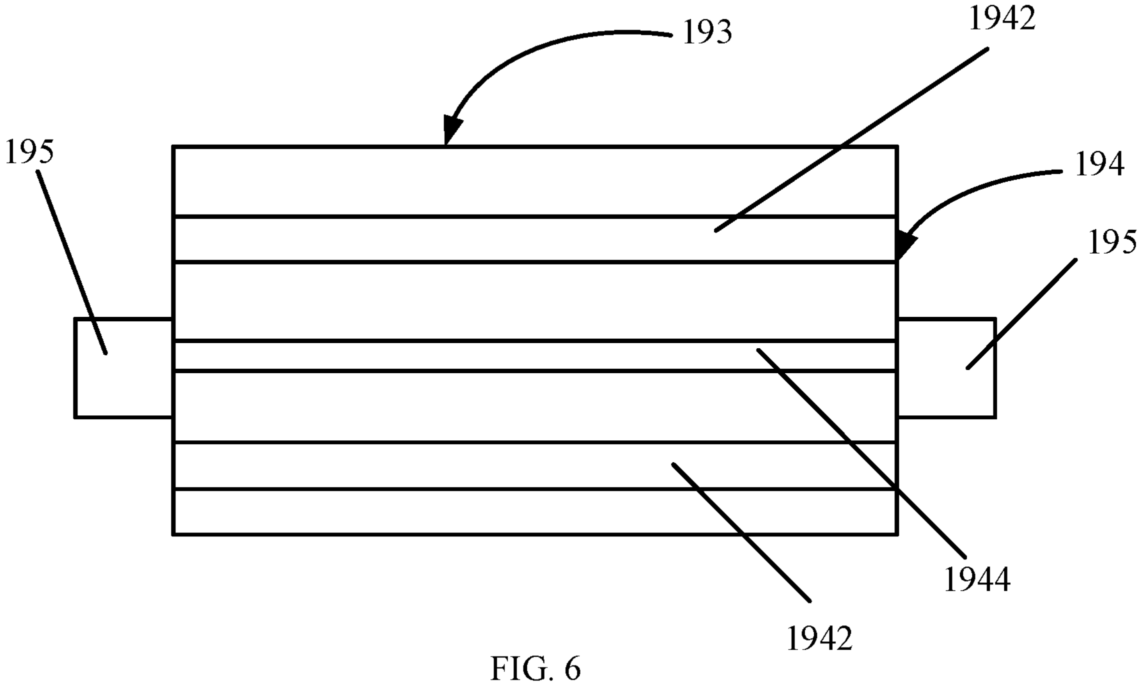
FIG. 6 is a schematic diagram of an interface layout of a rear panel of a circuit breaker according to an implementation of this application.
Figure 7:
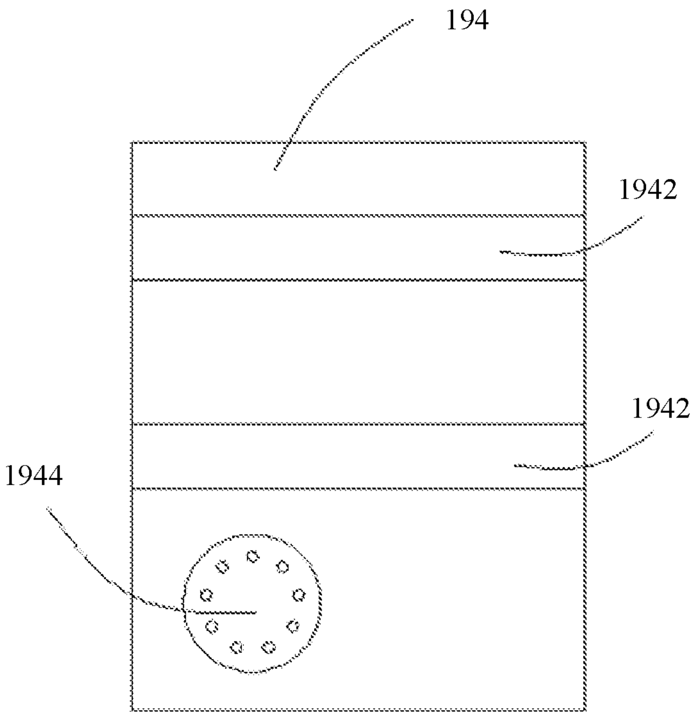
FIG. 7 is a schematic diagram of an interface layout of a rear panel of a circuit breaker according to another implementation of this application.
Figure 8:
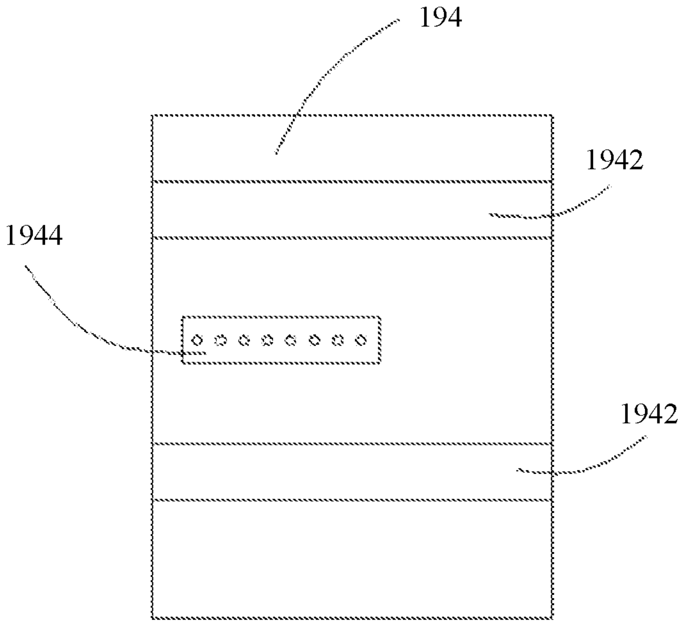
FIG. 8 is a schematic diagram of an interface layout of a rear panel of a circuit breaker according to still another implementation of this application.

FIG. 6, FIG. 7, and FIG. 8 are schematic diagrams of interface layouts on the rear panel 194 of the circuit breaker 19 according to three specific implementations.

As shown in FIG. 6, two power interfaces 1942 and one signal interface 1944 are disposed on the rear panel 194, the signal interface 1944 is located between the two power interfaces 1942, and both the power interfaces 1942 and the signal interface 1944 are female connectors in the form of fast insertion. The connector that is on the signal backplane of the power distribution system and that matches the signal interface 1944 is a golden finger disposed on the signal backplane.

As shown in FIG. 7, two power interfaces 1942 and one signal interface 1944 are disposed on the rear panel 194. The signal interface 1944 is located at the bottom of the rear panel 194, and the two power interfaces 1942 are respectively located at the top and the middle of the rear panel 194. The signal interface 1944 is a female connector in a form of aerial insertion. The power interface 1942 is a female connector in the form of fast insertion.

As shown in FIG. 8, two power interfaces 1942 and one signal interface 1944 are disposed on the rear panel 194, the signal interface 1944 is located between the two power interfaces 1942, the power interface 1942 is a female connector in the form of fast insertion, and the signal interface 1944 is a female connector in the form of pin insertion.

Figure 9:
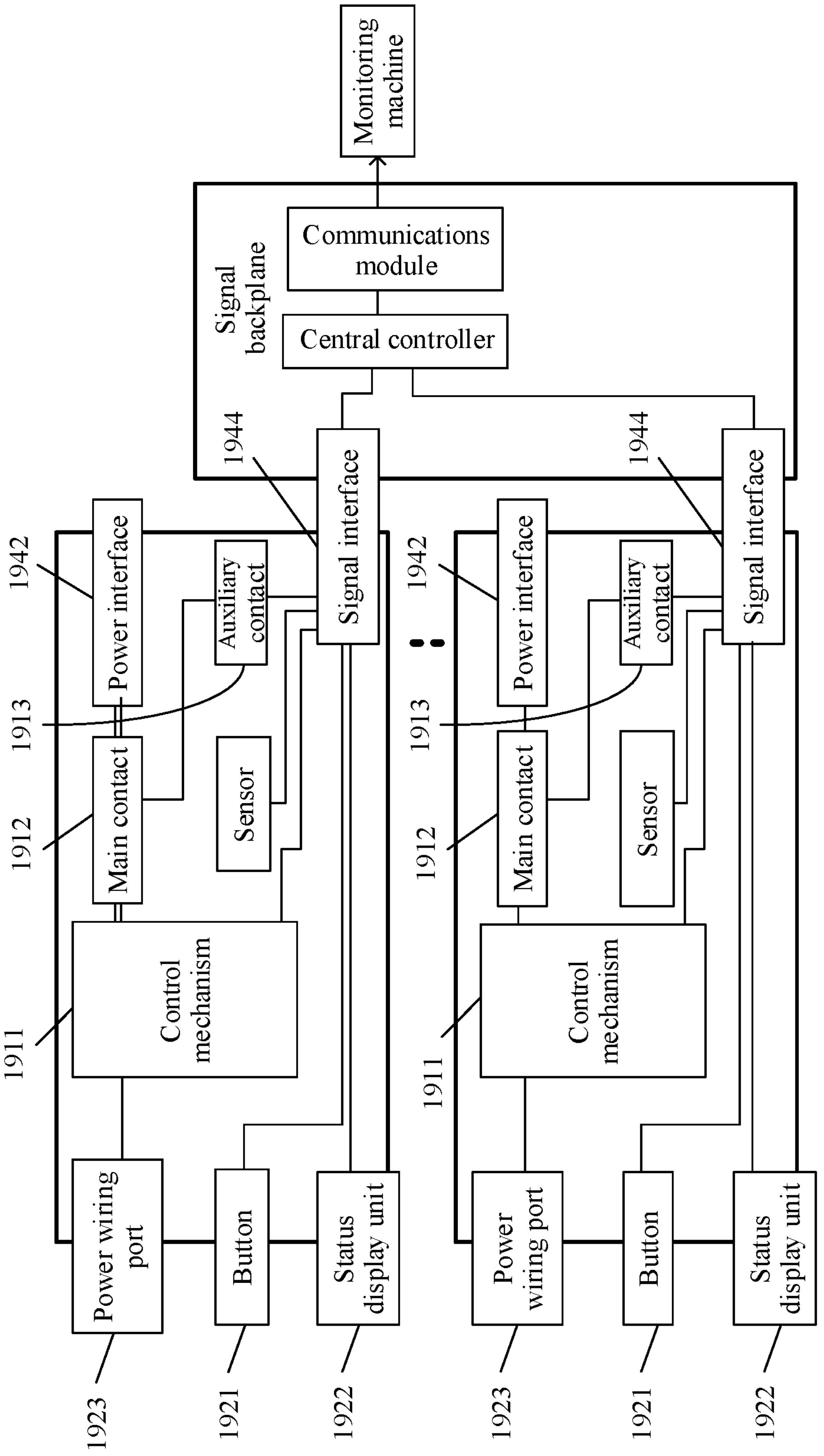
FIG. 9 is a schematic diagram of a connection relationship between a circuit breaker and a signal backplane in a power distribution system according to an implementation of this application.

As shown in FIG. 9, in a possible implementation, the internal element 191 of the circuit breaker 19 includes a control mechanism 1911, a main contact 1912, an auxiliary contact 1913, and a sensor 1914. The control mechanism 1911 has a control function, and can control opening and closing of the main contact 1912. The control mechanism 1911 may include an electromagnetic tripping device, an actuating mechanism, a circuit control unit, and the like. The sensor 1914 is a current sensor, the sensor 1914 is electrically connected to the signal interface 1944, so that the control unit (namely, the central controller 172) obtains a current signal from the circuit breaker. The main contact 1912 is configured to realize an opened state and a closed state of the circuit breaker 19, the auxiliary contact 1913 is electrically connected between the signal interface and the main contact 1912, the auxiliary contact 1913 is configured to transmit an opening/closing signal of the main contact 1912 to the control unit (namely, the central controller 172) through the signal interface 1944, so that the control unit transmits the opening/closing signal of the main contact 1912 to the status display unit 1922 through the signal interface 1944.

A size of the main contact 1912 is larger than a size of the auxiliary contact 1913. The main contact 1912 may be a silver plated copper sheet. A relative large current may flow through the main contact 1912, and a relatively small current passes through the auxiliary contact 1913. The main contact 1912 and the auxiliary contact 1913 are linked mechanically, namely, mechanically connected. When the main contact 1912 is closed, the auxiliary contact 1913 is also closed, and vice versa. In a specific implementation, a dynamic contact of the main contact 1912 and a dynamic contact of the auxiliary contact 1913 are fixed together by using an insulating material, and a static contact of the main contact 1912 and a static contact of the auxiliary contact 1913 are also fixed together by using an insulating material.

The status display unit 1922 may be an indicator (for example, an LED indicator), a liquid crystal display, or another display window.

Figure 10:
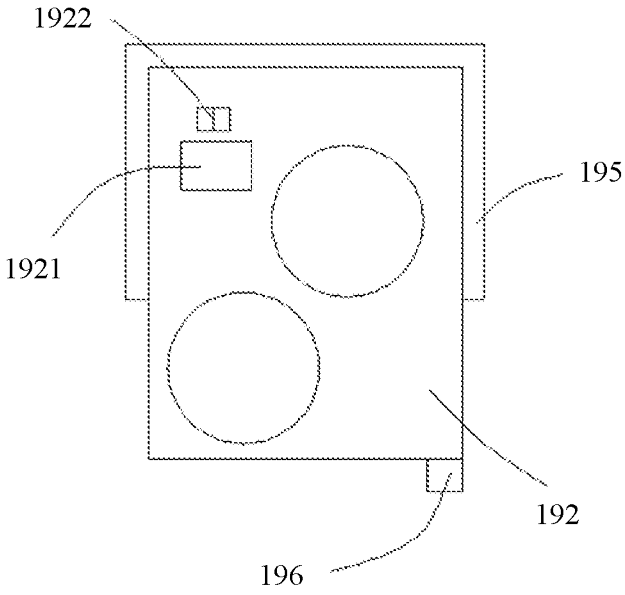
FIG. 10 shows a configuration of a status display unit and a button of a circuit breaker according to a first implementation.

FIG. 10 shows a configuration of the status display unit 1922 and the button 1921 of the circuit breaker 19 according to a first implementation. As shown in FIG. 10, the status display unit 1922 is a bicolor indicator, the status display unit 1922 and the button 1921 are disposed at an upper left corner position of the front panel 192 independently of each other, and the status display unit 1922 is located above the button 1921. When the circuit breaker 19 is controlled to be powered off, the indicator is off. To be specific, the control unit sends a signal indicating that the indicator is off to the signal interface 1944, so that the status display unit 1922 receives the signal, and the bicolor indicator enters an off state under control of the control unit. When the circuit breaker 19 is faulty, the control signal received by the signal interface 1944 is a signal indicating that the indicator alternately flashes two colors. For example, the bicolor indicator is a red/green bicolor indicator. When the circuit breaker 19 is faulty, a signal received by the signal interface 1944 from the external control unit is controlling the bicolor indicator to flash red, green, red, green, . . . , so that the red/green indicator flashes alternately at such a regular. When the circuit breaker 19 is in the opened state, the control signal received by the signal interface 1944 indicates that the indicator flashes a first color. When the circuit breaker 19 is in the closed state, the control signal received by the signal interface 1944 indicates that the indicator flashes a second color. For example, the first color is red, and the second color is green. When the circuit breaker is in a state of being configured, the control signal received by the signal interface indicates that the indicator is in a first color flashing state or a second color flashing state, for example, a red light flashing state or a green light flashing state. This implementation provides a new circuit breaker status display solution. The bicolor indicator is used to indicate a working status of the circuit breaker, so that not only space on the front panel 192 is saved, but also the working state is intuitive and is easily determined.

Figure 11:
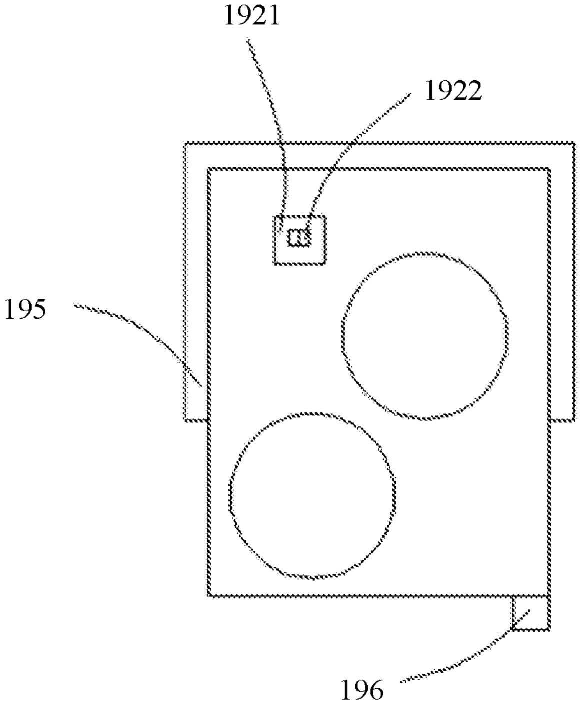
FIG. 11 shows a configuration of a status display unit and a button of a circuit breaker according to a second implementation.

FIG. 11 shows a configuration of a status display unit and a button of a circuit breaker according to a second implementation. As shown in FIG. 11, the button 1921 includes a housing in a partially transparent state or in a transparent state, the status display unit 1922 is a bicolor indicator, and the bicolor indicator is located inside the housing of the button 1921. In this implementation, the bicolor indicator is integrated inside the button, and the housing is in the partially transparent state or in the transparent state, so that a status of the bicolor indicator can be displayed to a user through the housing of the button. This facilitates improvement of an integration level, and saves space on the front panel.

Figure 12:
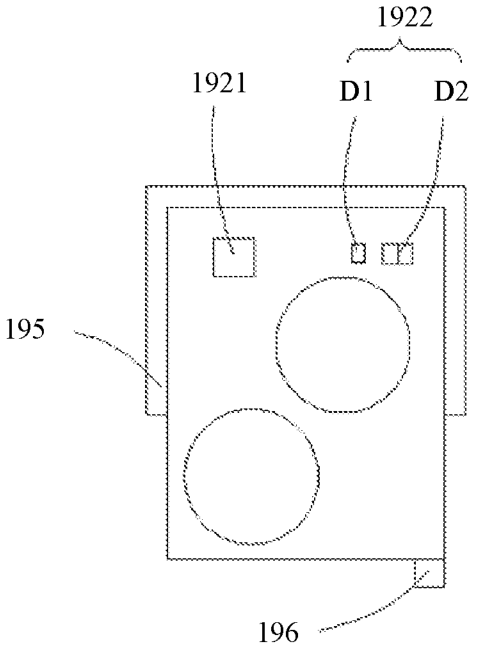
FIG. 12 shows a configuration of a status display unit and a button of a circuit breaker according to a third implementation.

FIG. 12 shows a configuration of a status display unit and a button of a circuit breaker according to a third implementation. As shown in FIG. 12, the status display unit 1922 includes a first indicator D1 and a second indicator D2. The first indicator D1 is a bicolor indicator. When the circuit breaker 19 is in the opened state, the control signal received by the signal interface 1944 indicates that the first indicator D1 flashes the first color. When the circuit breaker 19 is in the closed state, the control signal received by the signal interface 1944 indicates that the first indicator D1 flashes the second color. When the circuit breaker 19 is in the state of being configured, the control signal received by the signal interface 1944 indicates that the first indicator D1 is in the first color flashing state or the second color flashing state. The second indicator D2 is a single-color indicator, and is configured to indicate whether the circuit breaker 19 is powered off or faulty. When the control unit controls, through the signal interface 1944, the circuit breaker 19 to be powered off, the second indicator D2 is off; when the control unit controls, through the signal interface 1944, the circuit breaker 19 to be powered on, the second indicator D2 is on; or when the circuit breaker 19 is faulty, the second indicator D2 is in a flashing state. In this implementation, two indicators are used to display the status of the circuit breaker 19. One indicator is used to indicate whether the circuit breaker is powered on or faulty, and the other indicator is used to indicate whether the circuit breaker is open, closed, or being configured, to perform classified display, and provide the user with good experience.

Figure 13:
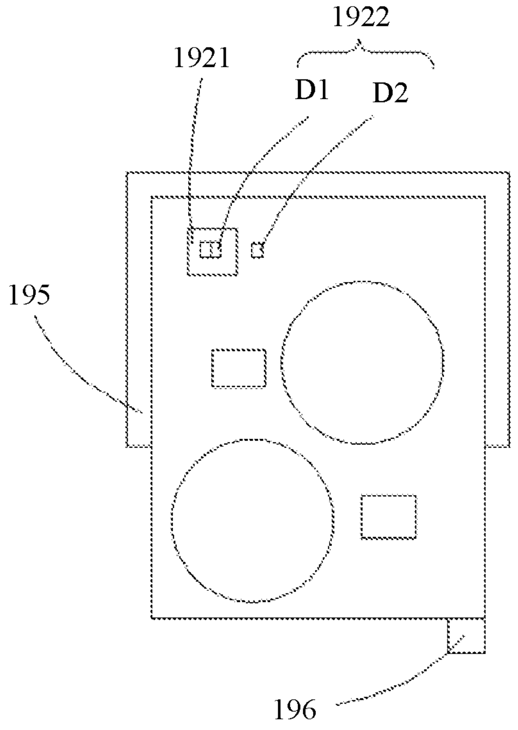
FIG. 13 shows a configuration of a status display unit and a button of a circuit breaker according to a fourth implementation.

FIG. 13 shows a configuration of the status display unit 1922 and the button 1921 of the circuit breaker 19 according to a fourth implementation. As shown in FIG. 13, the button 1921 includes a housing in a partially transparent state or in a transparent state, the status display unit 1922 includes a first indicator D1 and a second indicator D2, and the first indicator D1 is located inside the housing. In this implementation, the bicolor indicator is integrated inside of the housing of the button, and the second indicator D2 (the single-color indicator) is disposed outside the button 1921, and is disposed in parallel with the button 1921, to provide the user with good experience.

Figure 14:
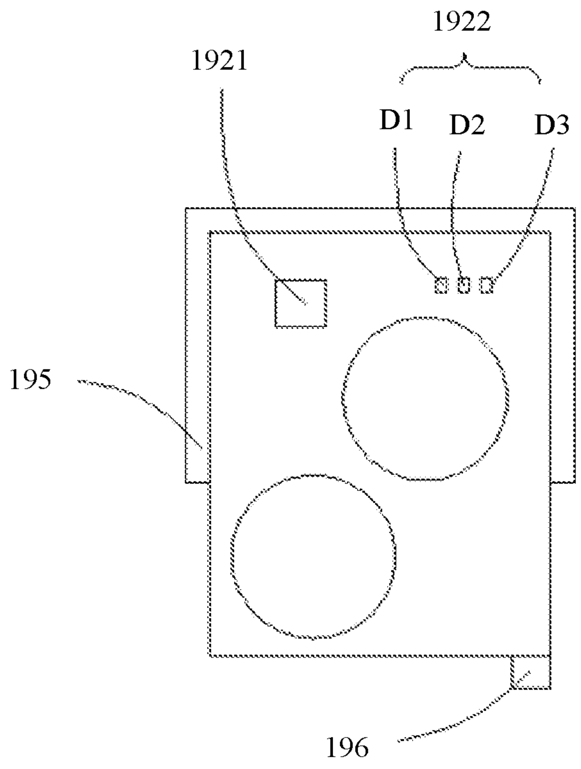
FIG. 14 shows a configuration of a status display unit and a button of a circuit breaker according to a fifth implementation.

FIG. 14 shows a configuration of the status display unit 1922 and the button 1921 of the circuit breaker 19 according to a fifth implementation. As shown in FIG. 14, the status display unit 1922 includes a first indicator D1, a second indicator D2, and a third indicator D3. When the circuit breaker 19 is in the opened state, the control signal received by the signal interface 1944 indicates that the first indicator D1 is on and the second indicator D2 is off; when the circuit breaker 19 is in the closed state, the control signal received by the signal interface 1944 indicates that the first indicator D1 is off and the second indicator D2 is on; or when the circuit breaker 19 is in the state of being configured, the control signal received by the signal interface 1944 indicates that the first indicator D1 flashes and/or the second indicator D2 flashes, meaning that the first indicator D1 flashes, the second indicator D2 flashes, or the first indicator D1 and the second indicator D2 flashes simultaneously. The third indicator D3 is a single-color indicator, and is configured to indicate whether the circuit breaker 19 is powered off or faulty. When the control unit controls, through the signal interface 1944, the circuit breaker 19 to be powered off, the third indicator D3 is off; when the control unit controls, through the signal interface 1944, the circuit breaker 19 to be powered on, the third indicator D3 is on; or when the circuit breaker 19 is faulty, the third indicator D3 is in a flashing state.

Specifically, the three single-color indicators are disposed in parallel at a corner position on the front panel 192, and colors of the three indicators may be the same or different. When the colors are the same, different marks are used to display functions performed by the indicators. For example, a different pattern or character is configured for each indicator on the front panel 192. When the colors are different, different colors may be used to distinguish between the functions performed by the indicators, or different patterns or characters may be further marked on the front panel 192.

Figure 15:
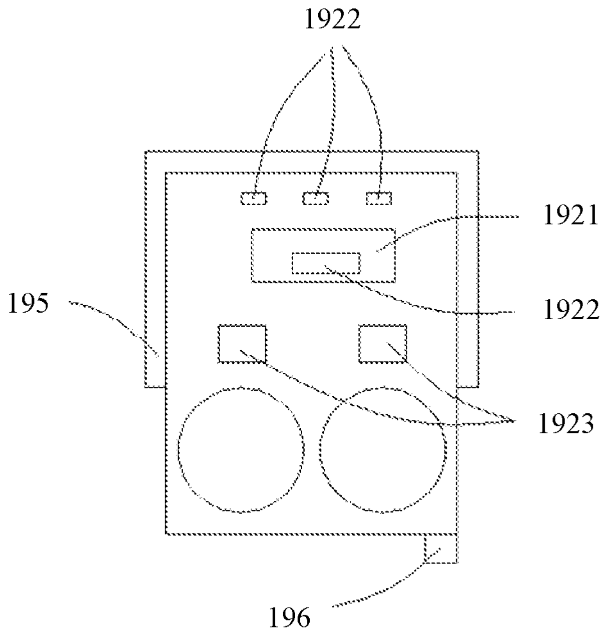
FIG. 15 shows a configuration of a status display unit and a button of a circuit breaker according to a sixth implementation.

FIG. 15 shows a configuration of the status display unit 1922 and the button 1921 of the circuit breaker 19 according to a sixth implementation. As shown in FIG. 15, the status display unit 1922 includes three indicators disposed independently of the button 1921 and a status display unit disposed inside the button 1921. The three indicators disposed independently of the button 1921 may be bicolor indicators, or may be single-color indicators. Certainly, a quantity of indicators disposed independently of the button

1921 is not limited to three, or may be two or more. The status display unit disposed inside the button 1921 may be one or two indicators, or may be a liquid crystal display panel. In this implementation, three indicators independent of the button 1921 are disposed above the button 1921, and two power wiring ports 1923 on the front panel 192 are disposed in parallel below the button 1921.

In the foregoing implementations, the button 1921 on the front panel 192 may be a mechanical button or an electronic button, or may be a touch button. When the button 1921 is a mechanical button, the button may be a self-locking button capable of maintaining two states of a popping-up state and a pressing-down state, and whether the circuit breaker is on or off may be determined based on the popping-up state and the pressing-down state. The button 1921 may alternatively have no self-locking capability. The status of the circuit breaker 19 is switched by pressing the button once, and the working state of the circuit breaker 19 is indicated in cooperation with the status display unit 1922. The button 1921 may be disposed with a housing of a material in the transparent or partially transparent (the partially transparent state includes a translucent state) state, and the status display unit 1922 is integrated inside the housing. The button 1921 may be a shape such as a circle, a square, or a rounded rectangle. There may be one or two buttons 1921. When there are two buttons 1921, one button 1921 is responsible for an opening operation of the circuit breaker 19, and the other button 1921 is responsible for a closing operation of the circuit breaker 19. Colors of the two buttons 1921 may be designed to be different, or shapes of the two buttons 1921 may be designed to be different, so that the user distinguishes between the two buttons.

Figure 16:
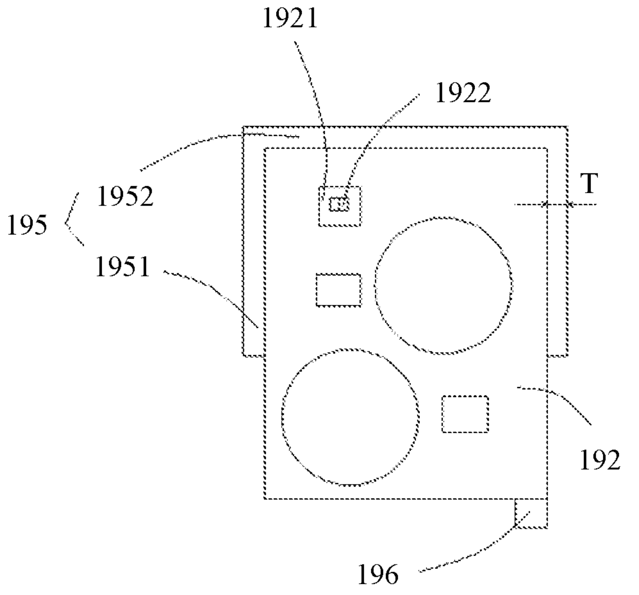
FIG. 16 is a schematic diagram of a front panel of a circuit breaker according to an implementation of this application, to mainly show a folded state of a pull ring.
Figure 17:
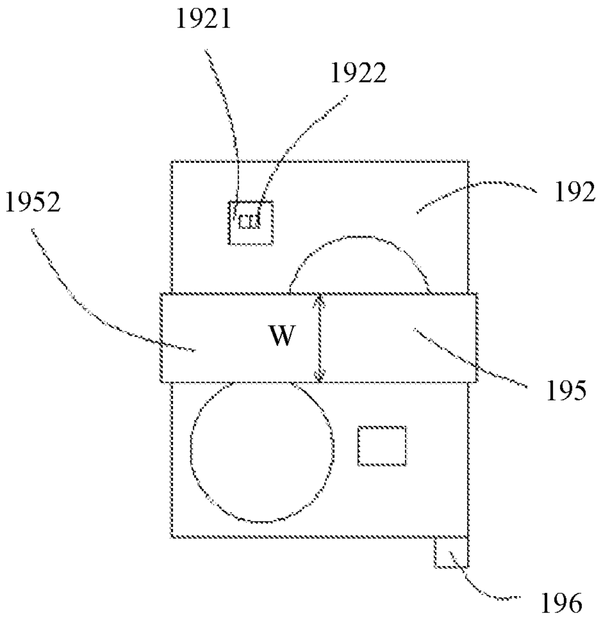
FIG. 17 is a schematic diagram of a front panel of a circuit breaker according to an implementation of this application, to mainly show an opened state of a pull ring.
Figure 18:
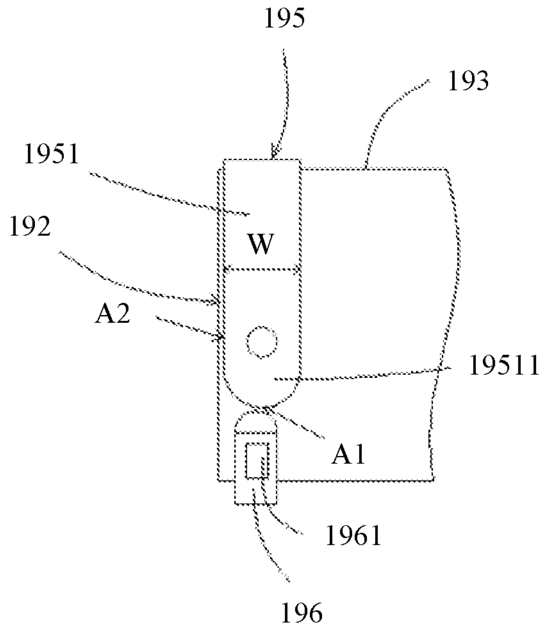
FIG. 18 is a schematic diagram in which a side panel of a circuit breaker is close to some areas of a front panel according to an implementation of this application, to mainly show a folded state of a pull ring.
Figure 19:
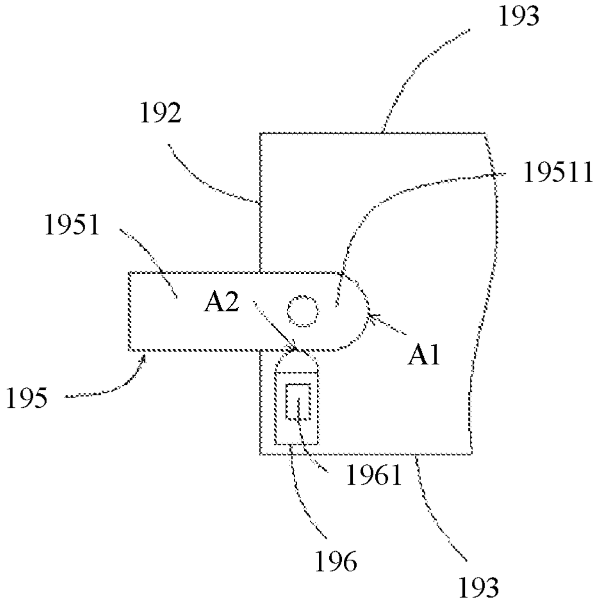
FIG. 19 is a schematic diagram in which a side panel of a circuit breaker is close to some areas of a front panel according to an implementation of this application, to mainly show an opened state of a pull ring.

The circuit breaker 19 further includes a pull ring and a lock. The lock is configured to lock the circuit breaker in the subrack in cooperation with the subrack of the power distribution system, and the pull ring is configured to be folded or opened relative to the front panel, to drive the lock to move for switching between a locking state and an unlocking state. FIG. 16 and FIG. 17 are schematic diagrams in which the pull ring 195 of the circuit breaker 19 is in a folded state and an opened state on the front panel 192. FIG. 18 and FIG. 19 are schematic diagrams in which the pull ring 195 of the circuit breaker 19 is in the folded state and the opened state on the side panel 193.

The pull ring 195 is located on a periphery of the front panel 192. FIG. 16 schematically shows that the pull ring 195 is in the folded state relative to the front panel 192. The pull ring 195 is located on an external side of an edge of the front panel 192. On a planar surface of the front panel 192, a part that is of the pull ring 195 and that externally extends from the edge of the front panel 192 is a thickness T of the pull ring 195 (refer to FIG. 16). On the planar surface of the side panel 193, the part that is of the pull ring 195 and that extends in a direction from the front panel 192 to the rear panel 194 is a width W of the pull ring 195 (refer to FIG. 17 and FIG. 18). The width W of the pull ring 195 is greater than the thickness T, and the width W of the pull ring 195 is relatively large, to facilitate convenient manual operation of the user. The thickness T is relatively small, to help reduce peripheral space of the front panel 192, facilitate miniaturization development of the circuit breaker 19, and save an occupied area of panel of the subrack.

The pull ring 195 is rotatably connected to the side panel 193, so that the pull ring 195 can be folded or opened relative to the front panel 192. Specifically, the pull ring 195 is rotatably connected to the side panel 193 by using a rotating shaft. Specifically, the pull ring 195 includes a pair of connecting rods 1951 disposed opposite to each other and a pull rod 1952 connected between the pair of connecting rods 1951, the pull rod 1952 is located at one end of the pair of connecting rods 1951, and the other end of the pair of connecting rods 1951 is rotatably connected to the side panel 193 of the circuit breaker 19 by using the rotating shaft. The pull ring 195 is in the folded state relative to the front panel 192. As shown in FIG. 16, the pair of connecting rods 1951 and the pull rod 1952 each are located on one side of the side panel. For example, the pair of connecting rods 1951 are respectively located on an external side of a left side panel 193 and an external side of a right side panel 193 of the circuit breaker 19, and the pull rod 1952 is located on an external side of a top side panel 193 or an external side of a bottom side panel 193 of the circuit breaker 19. When the pull ring 195 is opened relative to the front panel 192, the pull rod 1952 of the pull ring 195 is located in the front of the front panel 192. As shown in FIG. 17, the pull rod 1952 directly faces the front panel 192, so that a finger of the user contacts the pull rod 1952 to pull the circuit breaker 19. Specifically, a position at which the pull ring 195 is rotatably connected to the circuit breaker corresponds to an intermediate position between the top and the bottom of the front panel 192, so that when the pull ring 195 is in the opened state, a position of the pull rod 1952 directly faces a position of a center line of the front panel 192. The center line is a center line between the top and bottom of the front panel 192, and both the top and the bottom are parallel to the center line.

In another implementation, when the pull ring 195 is in the opened state, the position of the pull rod 1952 is located on a planar surface on which a center of gravity of the circuit breaker 19 is located, and the planar surface is perpendicular to the front panel 192.

Referring to FIG. 18 and FIG. 19, in a possible implementation, the end that is of the connecting rod 1951 and that is rotatably connected to the side panel 193 is centered at the rotating shaft, and the end of the connecting rod 1951 is cam-shaped. Specifically, the end that is of the connecting rod 1951 and that is near the rotating shaft is a top abutting end 19511, to abut against the lock 196. An outer edge of the top abutting end 19511 includes a first position A1 and a second position A2. A distance between the first position A1 and the rotating shaft is greater than a distance between the second position A2 and the rotating shaft (which refers to a center of the rotating shaft). When the pull ring 195 is in the folded state relative to the front panel 192, the first position A1 abuts against the lock 196, the lock 196 is in an extended state and fits the subrack to implement locking. When the pull ring 195 is in the opened state relative to the front panel 192, the second position A2 abuts against the lock 196, so that the lock 196 is in a retracted state, to release locking between the lock 196 and the subrack.

A surface between the first position A1 and the second position A2 on the pull ring 195 is curved and smooth. Correspondingly, a surface on which the lock 196 fits the pull ring 195 is also curved, and the lock 196 is disposed on a top holding surface 1961. The pull ring 195 is in the folded state when the top holding surface 1961 contacts the first position A1 on the top abutting end 19511 of the pull ring 195; and the pull ring 195 is in the opened state when the top holding surface 1961 contacts the second position A2 on the top abutting end 19511 of the pull ring 195.

Specifically, a position limiting structure is disposed at each of the first position A1 and the second position A2, and the position limiting structure may be a slot or a protrusion. Correspondingly, a position limiting structure is also disposed on the top holding surface 1961 (a protrusion or a slot that fits the position limiting structure on the pull ring 195). For example, a protrusion is disposed at the first position A1 and the second position A2, and a slot is disposed on the top holding surface 1961. Position limiting between the pull ring 195 and the lock 196 is achieved in the folded state and the opened state through fitting between the protrusion and the slot.

The lock 196 is movably connected to the housing, and the pull ring 195 rotates to drive the lock 196 to move, so that the lock 196 extends or retracts. The lock is slidably connected to the side panel 193, so that the lock 196 can slide in a direction relative to the side panel 193. For example, the lock 199 slides in a first direction relative to the side panel 193, the first direction is consistent with an extension direction of an edge of the front panel 192, and when the pull ring 195 is in the folded state relative to the front panel, an extension direction of the connecting rod 1951 of the pull ring 195 is also the first direction. Specifically, a slide rail may be disposed on the side panel 193, and the lock 196 is disposed with a slide block or a slide groove that fits the slide rail. The lock 196 is elastically connected to the side panel 193 by using an elastic part 1961, and the elastic part 1961 may be a spring. When the pull ring 195 is in the folded state relative to the front panel 192, the lock 196 is in the extended state, and the elastic part 1961 is elastically stretched and has elastic potential energy. When the pull ring 195 is in the opened state relative to the front panel 192, the elastic potential energy of the elastic part 1961 drives the lock 196 to retract automatically.

When the pull ring 195 is in the folded state, the lock 196 extends out of the side panel of the circuit breaker and the circuit breaker is attached to the subrack through locking. When the pull ring 195 is in an opened state relative to the front panel 192, the lock 196 retracts to release a locking relationship between the circuit breaker and the subrack. The pull rod rotates to the front of the front panel, so that the user manually pulls the circuit breaker 19 out of the subrack.

In this implementation, the circuit breaker 19 is installed in a subrack of the power distribution system, and may be inserted into the subrack and connected to a connector on the signal backplane in the power distribution system through insertion, to implement an electrical connection between the circuit breaker and the control unit in the central controller on the signal backplane, and implement an electrical connection between the circuit breaker and another circuit module on the signal backplane. The circuit breaker may also be pulled out of the subrack for maintenance or replacement. The circuit breaker is inserted into and pulled out of the subrack by using the pull ring. When the circuit breaker is inserted into the subrack, the circuit breaker can be locked into the subrack by using the lock, to prevent the circuit breaker from being accidentally separated from the subrack.

In a possible implementation, the pull ring 195 includes a first surface and a second surface that are disposed adjacently. When the pull ring is in the folded state relative to the front panel, the first surface faces the side panel 193, and the second surface faces a direction the same as the front panel 192. When the pull ring is in the opened state relative to the front panel, the first surface faces the front panel, and an area of the first surface is greater than an area of the second surface. The first surface is configured to contact a finger of the user. The first surface has a large area, to provide better experience. In a process in which the user pulls the pull ring, a hand feeling is better. The second surface is designed to have a small area, so that the pull ring occupies a relatively small area on the periphery of the front panel, to facilitate the small size design of the circuit breaker.

In a possible implementation, the first surface is arc-shaped, and may be a convex arc or a concave arc. An arc-shaped design helps the first surface fit the finger, to facilitate an operation.

In a possible implementation, the first surface is disposed with a rough structure, to increase friction. Specifically, the rough structure may be a bump, a dimple, a texture, or a combination thereof.

Figure 20:
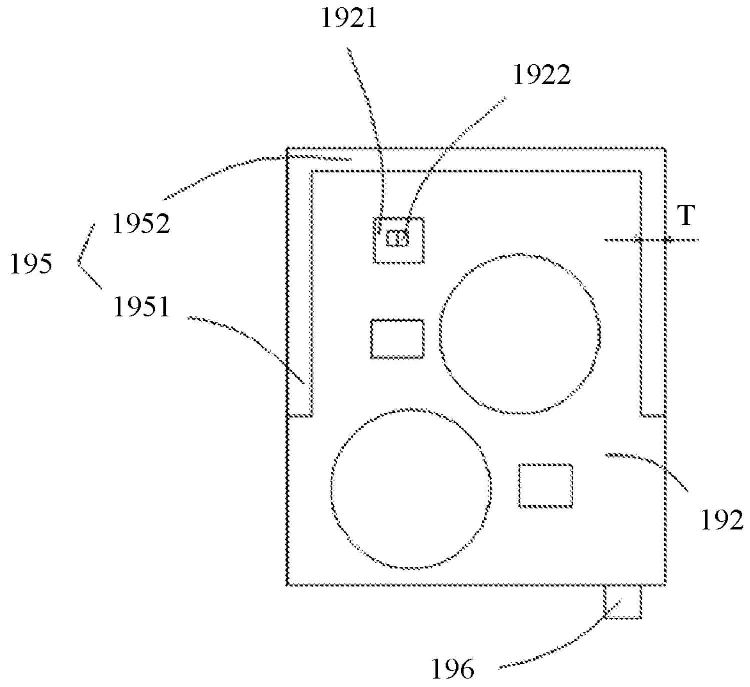
FIG. 20 is a schematic diagram of a front panel of a circuit breaker according to another implementation of this application, to mainly show a folded state of a pull ring.

FIG. 20 is a schematic diagram of the front panel 192 of the circuit breaker 19 according to another implementation of this application. In this implementation, space for placing the pull ring 195 is reserved at the edge of the front panel 192, and the front panel 192 is not a regular rectangle or square. As shown in FIG. 20, a pull ring mounting area is disposed in an edge area of an upper half area of the front panel 192, and the pull ring 195 is mounted inside the housing of the circuit breaker 19 and is located at a position of the pull ring mounting area. When the pull ring 195 is in the folded state relative to the front panel 192, a front end surface of the pull ring 195 is coplanar with the front panel 192, and an outer boundary of the pull ring 195 and an outer boundary of the front panel 192 are flush to form a rectangle or square. In this implementation, the pull ring 195 and the lock 196 are disposed on an inner side of the side panel 193 of the circuit breaker 19, and a through hole is disposed at the bottom of the side panel 193, so that the lock 196 can extend.

The foregoing descriptions are preferred implementations of this application. It should be noted that a person of ordinary skill in the art may make several improvements or polishing without departing from the principle of this application, and the improvements or polishing shall fall within the protection scope of this application.

What is claimed is:

1. A circuit breaker of a power distribution system, the circuit breaker comprising:

a housing, comprising a front panel and a rear panel that are disposed opposite to each other, wherein the rear panel is disposed with a power interface and a signal interface, the power interface is configured to be connected to the power distribution system;

an internal element disposed inside the housing;

a pull ring, configured to pull the circuit breaker out of the power distribution system; and a lock which fits the pull ring, configured to cooperate with the pull ring to lock or release the circuit breaker;

wherein the signal interface is internally and electrically connected to the internal element, and the signal interface is externally configured to be electrically connected to an external control unit disposed outside the circuit breaker; and a control signal of the control unit that is transmitted through the signal interface is used to implement working of the internal element;

wherein the pull ring is located on a periphery of the front panel and is foldable or openable relative to the front panel; and wherein the lock is movably connected to the housing and is drivable to extend or retract.

2. The circuit breaker according to claim 1, wherein the front panel is disposed with a button and a status display unit, the signal interface is electrically connected to the button and the status display unit, and the control signal of the external control unit is transmitted to the button and the status display unit through the signal interface.

3. The circuit breaker according to claim 2, wherein the status display unit comprises a bicolor indicator; and in response to the circuit breaker being controlled to be powered off, the indicator is off; in response to the circuit breaker being faulty, the control signal received by the signal interface is a signal indicating that the indicator alternately flashes two colors; in response to the circuit breaker being in an opened state, the control signal received by the signal interface indicates that the indicator flashes a first color; in response to the circuit breaker being in a closed state, the control signal received by the signal interface indicates that the indicator flashes a second color; or in response to the circuit breaker being in a state of being configured, the control signal received by the signal interface indicates that the indicator is in a first color flashing state or a second color flashing state.

4. The circuit breaker according to claim 3, wherein the button comprises a housing in a partially transparent state or in a transparent state, and the bicolor indicator is located inside the housing.

5. The circuit breaker according to claim 2, wherein the status display unit comprises a first indicator and a second indicator; the first indicator is a bicolor indicator; and in response to the circuit breaker being in an opened state, the control signal received by the signal interface indicates that the first indicator flashes a first color; in response to the circuit breaker being in a closed state, the control signal received by the signal interface indicates that the first indicator flashes a second color; in response to the circuit breaker being faulty, the control signal received by the signal interface is a signal indicating that the first indicator alternately flashes two colors; or in response to the circuit breaker being in a state of being configured, the control signal received by the signal interface indicates that the first indicator is in a first color flashing state or a second color flashing state; and the second indicator is a single-color indicator, and is configured to indicate whether the circuit breaker is powered off or faulty.

6. The circuit breaker according to claim 5, wherein the button comprises a housing in a partially transparent state or in a transparent state, and the first indicator is located inside the housing.

7. The circuit breaker according to claim 2, wherein the status display unit comprises a first indicator, a second indicator, and a third indicator; and in response to the circuit breaker being in an opened state, the control signal received by the signal interface indicates that the first indicator is on and the second indicator is off; in response to the circuit breaker being in a closed state, the control signal received by the signal interface indicates that the first indicator is off and the second indicator is on; or in response to the circuit breaker being in a state of being configured, the control signal received by the signal interface indicates that the first indicator flashes and/or the second indicator flashes; and the third indicator is a single-color indicator, and is configured to indicate whether the circuit breaker is powered off or faulty.

8. The circuit breaker according to claim 1, further comprising: a pull ring and a lock, wherein the front panel and the rear panel are connected by using a side panel; the pull ring is located on a periphery of the front panel, and the pull ring is rotatably connected to the side panel, so that the pull ring can be folded or opened relative to the front panel; and the lock is movably connected to the housing, the lock fits the pull ring, and the pull ring rotates to drive the lock to move, so that the lock extends or retracts.

9. The circuit breaker according to claim 8, wherein the pull ring comprises a first surface and a second surface that are disposed adjacently; and in response to the pull ring being in a folded state relative to the front panel, the first surface faces the side panel, and the second surface faces a direction the same as the front panel; or in response to the pull ring being in an opened state relative to the front panel, the first surface faces the front panel, and an area of the first surface is greater than an area of the second surface.

10. The circuit breaker according to claim 9, wherein the first surface is arc-shaped.

11. The circuit breaker according to claim 9, wherein the first surface is disposed with a rough structure, to increase friction.

12. The circuit breaker according to claim 8, wherein a pull ring mounting area is disposed at an edge of the front panel, the pull ring is mounted inside the housing and is located in the pull ring mounting area, and in response to the pull ring being in a folded state relative to the front panel, a front end face of the pull ring is coplanar with the front panel, and an outer boundary of the pull ring and an outer boundary of the front panel jointly form a square.

13. The circuit breaker according to claim 12, wherein the plurality of pins further comprise a power supply pin, an electrical control signal pin, a current sensor pin, and a switch state feedback signal pin.

14. The circuit breaker according to claim 1, wherein the signal interface comprises a plurality of pins, which comprise a button signal pin and a status display unit control signal pin, the button signal pin is electrically connected to the button, and the status display unit control signal pin is connected to the status display unit.

15. The circuit breaker according to claim 1, wherein the internal element comprises a main contact and an auxiliary contact, the main contact is configured to implement the opened state and the closed state of the circuit breaker, the auxiliary contact is electrically connected between the signal interface and the main contact, and the auxiliary contact is configured to transmit an opening/closing signal of the main contact to the control unit through the signal interface, so that the control unit transmits the opening/closing signal of the main contact to the status display unit through the signal interface.

16. A power distribution system comprising: a monitoring machine, a signal backplane, and at least two circuit breakers, wherein a central controller and a communications module are disposed on the signal backplane, the central controller comprises at least two control units, the signal interfaces of the at least two circuit breakers are electrically connected to the at least two control units in a one-to-one correspondence manner, and the communications module is electrically connected between the monitoring machine and the central controller;

wherein each of the at least two circuit breakers comprises:

a housing, which comprises a front panel and a rear panel that are disposed opposite to each other, wherein the front panel is disposed with a power wiring port, and the rear panel is disposed with a power interface and a signal interface, the power wiring port and the power interface are configured to be connected to a circuit of a power distribution system, to provide a main power circuit; and an internal element disposed inside the housing;

wherein the signal interface is internally and electrically connected to the internal element, and the signal interface is externally configured to be electrically connected to a control unit disposed outside the housing; and a control signal of the control unit that is transmitted through the signal interface is used to implement working of the internal element.

17. The power distribution system according to claim 16, wherein the front panel is disposed with a button and a status display unit, the signal interface is electrically connected to the button and the status display unit, and the control signal of the control unit is transmitted to the button and the status display unit through the signal interface.

18. The power distribution system according to claim 17, wherein the status display unit comprises a bicolor indicator; and in response to the circuit breaker being controlled to be powered off, the indicator is off; in response to the circuit breaker being faulty, the control signal received by the signal interface is a signal indicating that the indicator alternately flashes two colors; in response to the circuit breaker being in an opened state, the control signal received by the signal interface indicates that the indicator flashes a first color; in response to the circuit breaker being in a closed state, the control signal received by the signal interface indicates that the indicator flashes a second color; or in response to the circuit breaker being in a state of being configured, the control signal received by the signal interface indicates that the indicator is in a first color flashing state or a second color flashing state.

19. The power distribution system according to claim 18, wherein the button comprises a housing in a partially transparent state or in a transparent state, and the bicolor indicator is located inside the housing.

20. The power distribution system according to claim 17, wherein the status display unit comprises a first indicator and a second indicator; the first indicator is a bicolor indicator; and in response to the circuit breaker being in an opened state, the control signal received by the signal interface indicates that the first indicator flashes a first color; in response to the circuit breaker being in a closed state, the control signal received by the signal interface indicates that the first indicator flashes a second color; in response to the circuit breaker being faulty, the control signal received by the signal interface is a signal indicating that the first indicator alternately flashes two colors; or in response to the circuit breaker being in a state of being configured, the control signal received by the signal interface indicates that the first indicator is in a first color flashing state or a second color flashing state; and the second indicator is a single-color indicator, and is configured to indicate whether the circuit breaker is powered off or faulty.

* * * * *